United States Patent
Wang

(10) Patent No.: US 11,090,769 B2
(45) Date of Patent: Aug. 17, 2021

(54) PIPE CLAMPING APPARATUS OF PIPE PROCESSING MACHINE

(71) Applicant: Sheng Tsung Wang, Tainan (TW)

(72) Inventor: Sheng Tsung Wang, Tainan (TW)

(73) Assignee: CHIAO SHENG MACHINERY CO., LTD., Tainan (TW)

( * ) Notice: Subject to any disclaimer, the term of this patent is extended or adjusted under 35 U.S.C. 154(b) by 248 days.

(21) Appl. No.: 16/449,814

(22) Filed: Jun. 24, 2019

(65) Prior Publication Data
US 2020/0398384 A1  Dec. 24, 2020

(51) Int. Cl.
*B23K 37/053* (2006.01)
*B25B 5/06* (2006.01)
*B23Q 3/06* (2006.01)

(52) U.S. Cl.
CPC .......... *B23K 37/0533* (2013.01); *B23Q 3/064* (2013.01); *B25B 5/061* (2013.01)

(58) Field of Classification Search
CPC ............ B23K 37/0533; B23B 2231/14; B23B 2270/027; B23Q 3/06; B23Q 3/08; B23Q 3/064; B23Q 17/00; B25B 1/02; B25B 1/06; B25B 5/061; B25B 5/122; B25B 5/147; B25B 13/28; G05D 15/01; Y10T 29/49998
USPC ..... 29/243.523, 243.55, 252; 269/55, 73, 45
See application file for complete search history.

(56) References Cited

U.S. PATENT DOCUMENTS

| 7,040,629 | B2 * | 5/2006 | Horisberger | B23B 31/16129 279/121 |
| 9,120,176 | B2 * | 9/2015 | Nishiyama | B23K 37/04 |
| 9,428,972 | B2 * | 8/2016 | Rosano | E21B 19/164 |
| 10,016,865 | B2 * | 7/2018 | Linder | B23Q 3/08 |

FOREIGN PATENT DOCUMENTS

| CN | 105014295 B | * | 8/2016 | |
| CN | 106238887 A | * | 12/2016 | |
| CN | 106670663 A | * | 5/2017 | |
| WO | WO-2016142142 A1 | * | 9/2016 | ....... B23B 31/16233 |

* cited by examiner

*Primary Examiner* — Joseph J Hail
*Assistant Examiner* — Jonathan R Zaworski
(74) *Attorney, Agent, or Firm* — Che-Yang Chen; Law Office of Michael Chen

(57) ABSTRACT

A pipe clamping apparatus of a pipe processing machine includes first and second slide rails on inner and outer end surfaces of the clamping apparatus, a turntable with slot openings, first and second rotating rings with a gear rack, plural linkage modules and plural clamping components. A rod of the pneumatic cylinder is fixed to the inner end surface; the pneumatic cylinder has a rack engaged with the gear rack and is fixed to a block having an oblique slot and a rail slot; and the clamping component has a claw, a slider passing through the slot opening and oblique slot, and a rail slot. Air drives the pneumatic cylinder to move, while the rack is driving the first or second rotating rings to move the opposite pneumatic cylinder in an opposite direction, and the slider slides in the oblique slot to drive the claw to clamp the pipe.

3 Claims, 11 Drawing Sheets

PIPE CLAMPING APPARATUS OF PIPE PROCESSING MACHINE

FIELD OF THE INVENTION

The present invention relates to the technical field of a pipe clamping apparatus, and more particularly to the pipe clamping apparatus that clamps a pipe, rotates the pipe by a turntable, and operates together with a pipe processing machine to carry out a pipe processing operation.

BACKGROUND OF THE INVENTION

With reference to FIG. 1 for a conventional pipe processing machine 1, the pipe processing machine 1 comprises a feeding mechanism 12, a rotating mechanism 13, and a processing mechanism 14 which are installed to a machine 11, and the rotating mechanism 13 has a turntable 131 with a clamping apparatus 132, so that when a pipe 2 is sent to the rotating mechanism 13 through the feeding mechanism 12, a clamping apparatus 132 of the rotating mechanism 13 for clamping the pipe 2, and a power source (not shown in the figure) is provided for driving the turntable 131 to rotate, and the processing mechanism 12 such as a laser device is provided for a processing operation such as cutting the pipe, punching holes on the pipe, or engraving the pipe. Since the conventional pipe processing machine adopts an air-driven clamping apparatus 132, therefore the air pipe may be tangled and claws of the clamping apparatus 132 may be damaged easily.

To overcome the aforementioned drawback, R.O.C. Pat. No. I587965 discloses a "Laser pipe cutting machine and a pneumatic rotating chuck thereof". In an embodiment of this patent, a pneumatic cylinder of a first rotating chuck is moved in a horizontal direction, a pneumatic cylinder of a second rotating chuck is moved in a vertical direction, a claw mechanism is formed on the turntable and provided for connecting a disc of a driving device, a guide rail and a first driven wheel and a second driven wheel with arc serrations are disposed on the disc, and the arc serrations are engaged with the first rack and the second rack of the claw mechanism respectively, and an output shaft of the pneumatic cylinder has a guide rail mounted on the linkage block by a slider, and the first rack and the second rack of the claw mechanism are disposed on the linkage block, so that when compressed air enters into the pneumatic cylinder to push the output shaft forward or pull the output shaft backward, the linkage block is driven to displace the first rack and the second rack synchronously with the first or second driven wheel simultaneously, so as to drive the claw mechanism to slide towards the pipe. Although the aforementioned patent can overcome the drawback of the conventional pneumatic clamping apparatus that may have tangled air pipe easily and can reduce the total volume of the clamping apparatus by means of the design of a staggered claw mechanism, yet the pneumatic cylinder is fixed to the disc, so that it is necessary to reserve a space on the disc for the stroke of the output shaft of the pneumatic cylinder. As a result, the reduced total volume of the disc is limited. In addition, the claw mechanism and the driving device are disposed on the same end surface of the disc, and thus the weight distribution of the disc will be uneven, or the disc may even be tilted due to the center of gravity of the disc and affects the laser processing precision. Obviously, the conventional clamping apparatus requires improvements.

SUMMARY OF THE INVENTION

In view of the problems of the conventional pneumatic clamping apparatus including the tangled air pipe and the large volume of the whole assembly, and the problem of the improved clamping apparatus including the uneven weight distribution of the disc weight, it is a primary objective of the present invention to install a linkage module and a clamping component at the inner and outer end surfaces of the turntable respectively, so that the staggered linkage module and clamping component can reduce the volume of the clamping apparatus, and to link the clamping component by the operation of the pneumatic cylinder to achieve the effect of clamping the pipe easily.

To achieve the aforementioned and other objectives, the present invention provides a pipe clamping apparatus of a pipe processing machine, and the clamping apparatus is driven to rotate by a power mechanism, and the clamping apparatus comprises: a turntable, having a rotating shaft linked to the power mechanism, an inner end surface and an outer end surface, a plural sets of first slide rails and second slide rails disposed on the inner end surface and the outer end surface respectively, and a plurality of slot openings formed on the turntable; a first rotating ring, sheathed on the rotating shaft, and having a gear rack formed on two opposite ring surfaces of the first rotating ring separately; a second rotating ring, sheathed on the rotating shaft, and having a gear rack formed on two opposite ring surfaces of the second rotating ring and staggered with the gear rack of the first rotating ring separately; a plurality of linkage modules, for locking a rod of a pneumatic cylinder to the inner end surface securely, and having a rack disposed on the pneumatic cylinder and facing an end surface of the first or second rotating ring and engaged with the gear rack, a block fixed to the pneumatic cylinder, and the block having an oblique slot and a rail slot embedded into the first slide rail; and a plurality of clamping components, each having a claw formed thereon, and a slider passing through the slot opening and the oblique slot, and the clamping component having a rail slot formed thereon and embedded into the second slide rail.

Based on the above, compressed air enters into the pneumatic cylinder to drive the pneumatic cylinder to be displaced along the rod. While the pneumatic cylinder is being displaced, the rack drives the first or second rotating ring to be displaced in an opposite direction of another pneumatic cylinder synchronously. Now, the slider of the clamping component slides from an end the other end of the oblique slot of the block, so that the block is fixed to the pneumatic cylinder due to the displacement, and the claw of the clamping component is moved towards the axis of the turntable, so as to achieve the effect of clamping the pipe.

DESCRIPTION OF THE PREFERRED EMBODIMENTS

The technical contents of the present invention will become apparent with the detailed description of preferred embodiments accompanied with the illustration of related drawings as follows. It is intended that the embodiments and figures disclosed herein are to be considered illustrative rather than restrictive.

Figure 1:
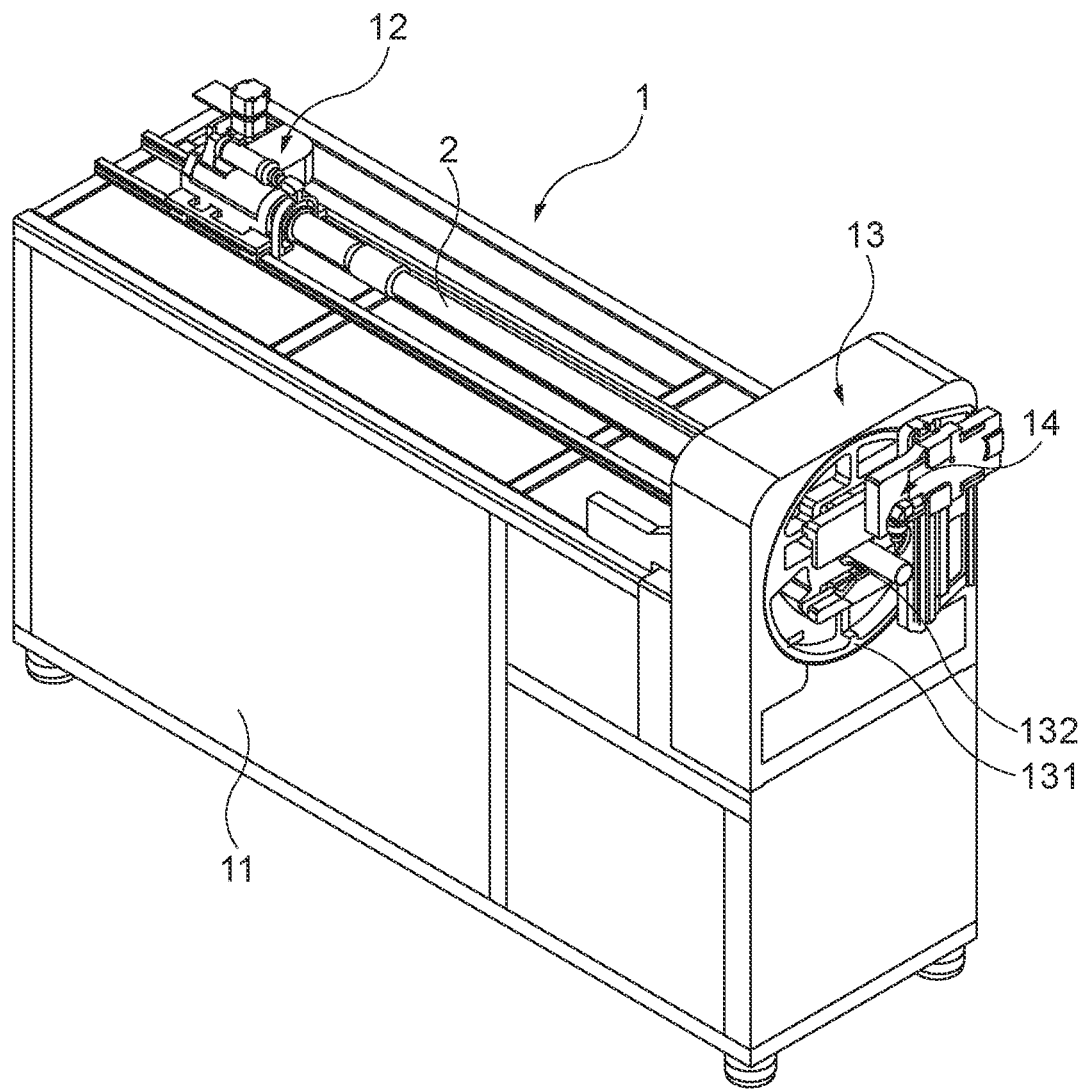
FIG. 1 is a schematic view of a conventional pipe processing machine.
Figure 2:
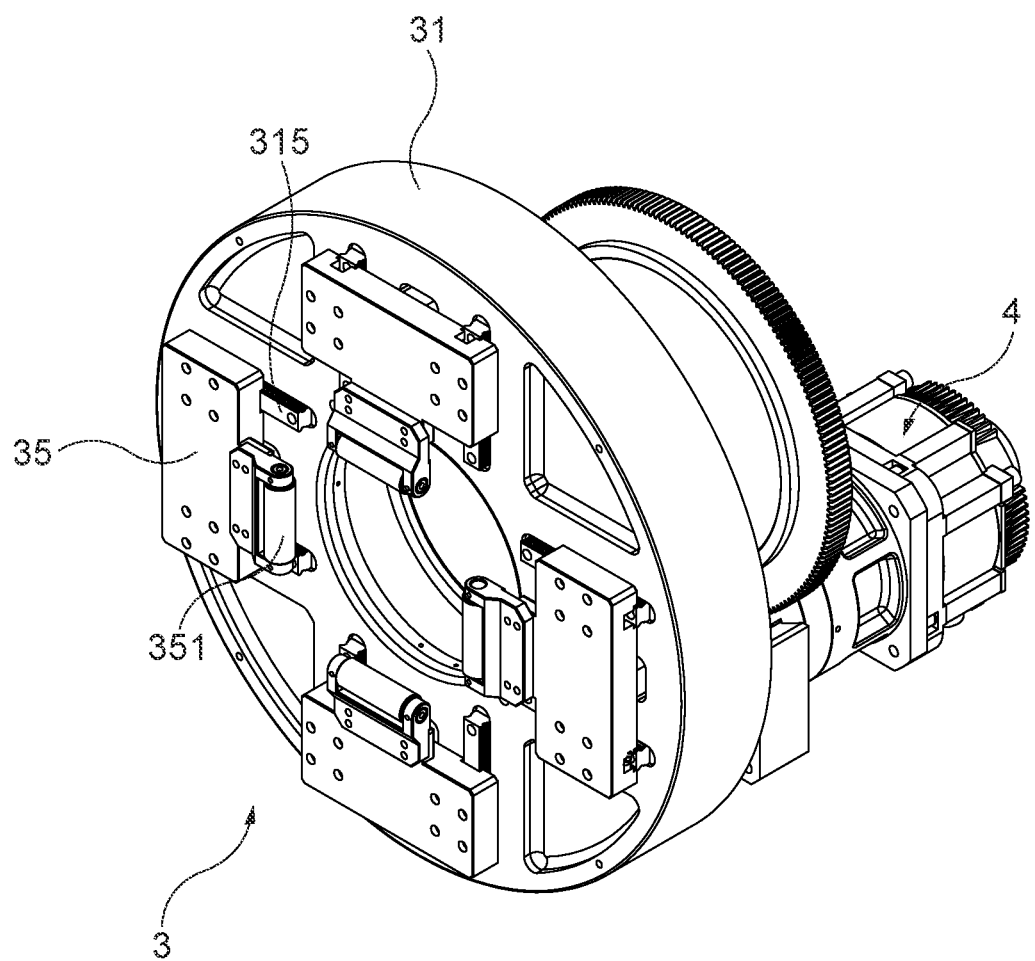
FIG. 2 is a perspective view of the present invention.
Figure 3:
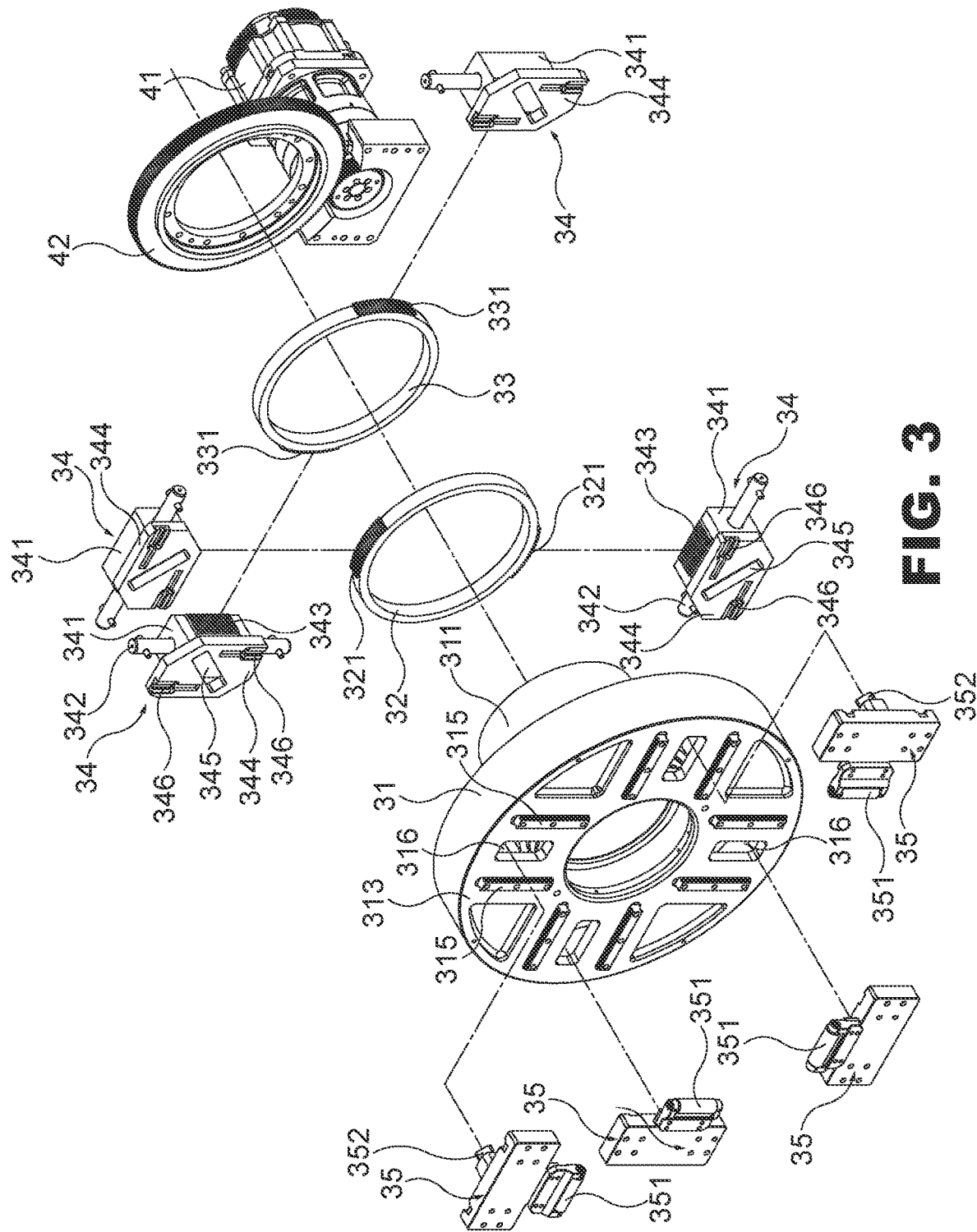
FIG. 3 is an exploded view of the present invention.
Figure 4:
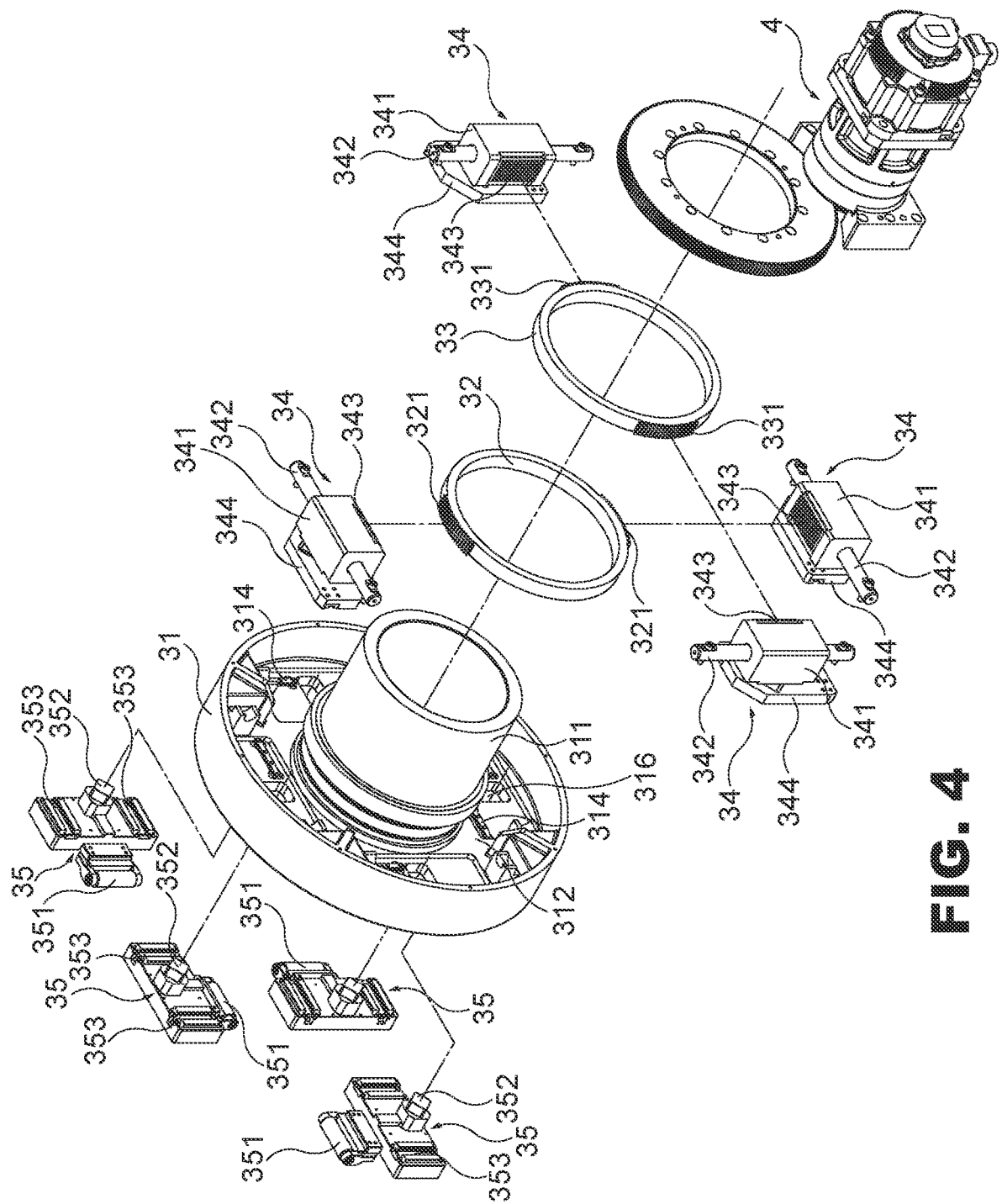
FIG. 4 is another exploded view of the present invention.

With reference to FIGS. 2~4 for a clamping apparatus of the present invention, the clamping apparatus 3 is driven to rotate by a power mechanism 4, and the clamping apparatus 3 comprises a turntable 31, a first rotating ring 32, a second rotating ring 33, a plurality of linkage modules 34, and a plurality of clamping components 35.

Figure 5:
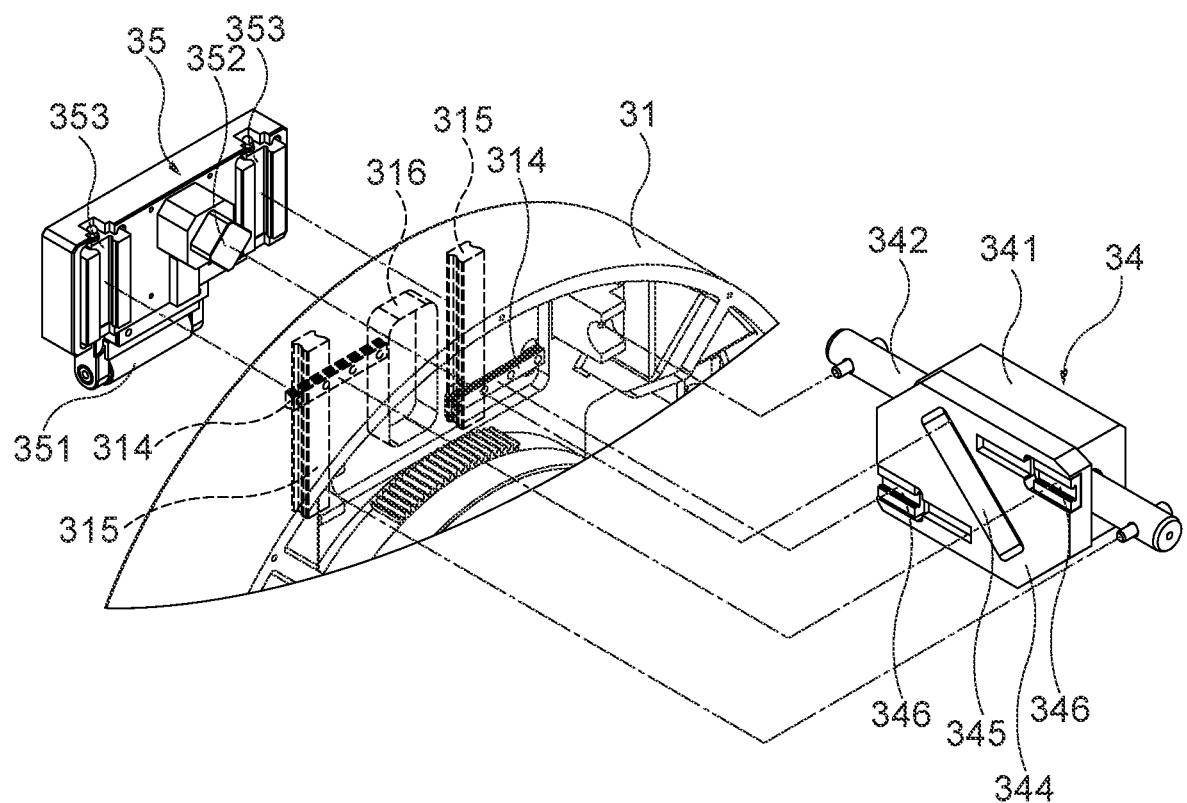
FIG. 5 is a schematic view showing the assemblies of a clamping component and a linkage module of the present invention.

The turntable 31 has a rotating shaft 311 linked with the power mechanism 4, an inner end surface 312 and an outer end surface 313 formed on the turntable 31, four first slide rails 314 and four second slide rails 315 disposed on the inner end surface 312 and the outer end surface 313 respectively, and four slot openings 316 formed on the turntable 31; the first rotating ring 32 is sheathed on the rotating shaft 311 of the turntable 31, and the first rotating ring 32 has a gear rack 321 formed on two opposite ring surfaces thereof; the second rotating ring 33 is sheathed on the rotating shaft 311 of the turntable 31, and the two opposite ring surfaces of the second rotating ring 33 have a gear rack 331 staggered with the gear rack 321 of the first rotating ring 32; the linkage module 34 fixes a rod 342 of a pneumatic cylinder 341 to an inner end surface 312 of the turntable 31 securely (as shown in FIG. 4), and the pneumatic cylinder 341 has a rack 343. In an embodiment of the present invention, the pneumatic cylinders 341 of two of the four linkage modules 34 are configured to be facing an end surface of the first rotating ring 32, so that the rack 343 of the pneumatic cylinder 341 is engaged with the gear rack 321 of the first rotating ring 32, and the pneumatic cylinders 341 of the two linkage modules 34 are configured to be opposite to each other and facing towards an end surface of the second rotating ring 33, so that the rack 343 of the pneumatic cylinder 341 is engaged with the gear rack 331 of the second rotating ring 33, and a block 344 is fixed to the pneumatic cylinder 341 (refer to FIG. 5 as well), and the block 344 has an oblique slot 345 and a rail slot 346 for embedding the first slide rail 314; the clamping component 35 has a claw 351 fixed thereto, a slot opening 316 for passing a turntable 31, a slider 352 disposed at an oblique slot 345 of the linkage module 34, and a rail slot 353 of the clamping component 35 for embedding a second slide rail 315 of the turntable 31; the power mechanism 41 couples a driving shaft of a power source 41 to a linkage gear set 42 axially and sheathes the linkage gear set 42 on the rotating shaft 311 of the turntable 31, such that the power source 41 can drive the turntable 31 to rotate with the rotation of the linkage gear set 42.

Figure 6:
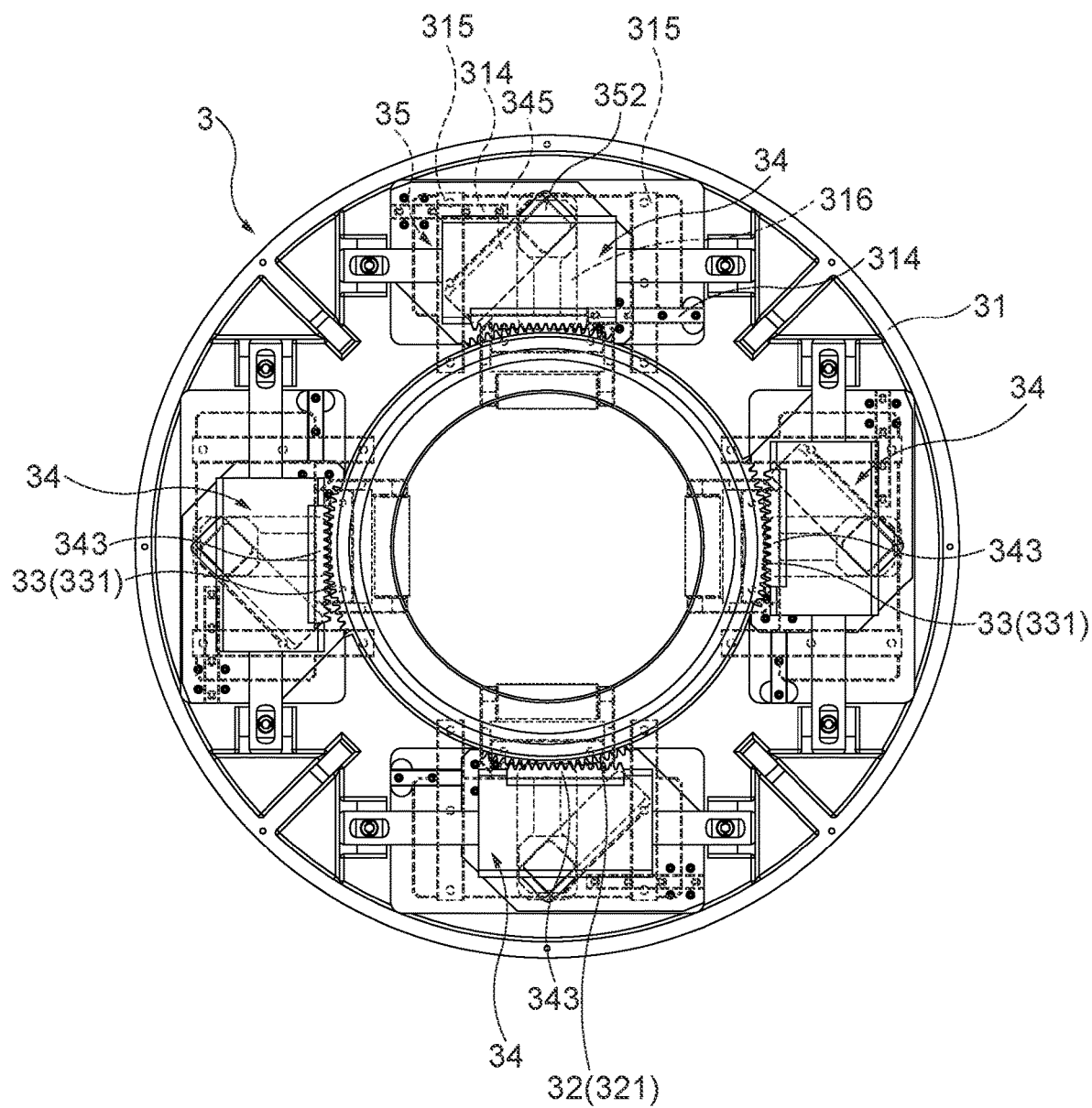
FIG. 6 is a schematic view showing the assembled clamping component and a linkage module of the present invention.

In FIG. 6, the linkage module 34 and the clamping component 35 of the assembled clamping apparatus 3 are disposed on the first slide rail 314 and the second slide rail 315 at two opposite end surfaces of the turntable 31 respectively, and the slider 352 of the clamping component 35 is passed through the slot opening 316 of the turntable 31 and disposed in the oblique slot 345 of the linkage module 34, and two opposite racks 343 of the linkage module 34 are engaged with the gear rack 321, 331 of the first rotating ring 32 or the second rotating ring 33.

Figure 7:
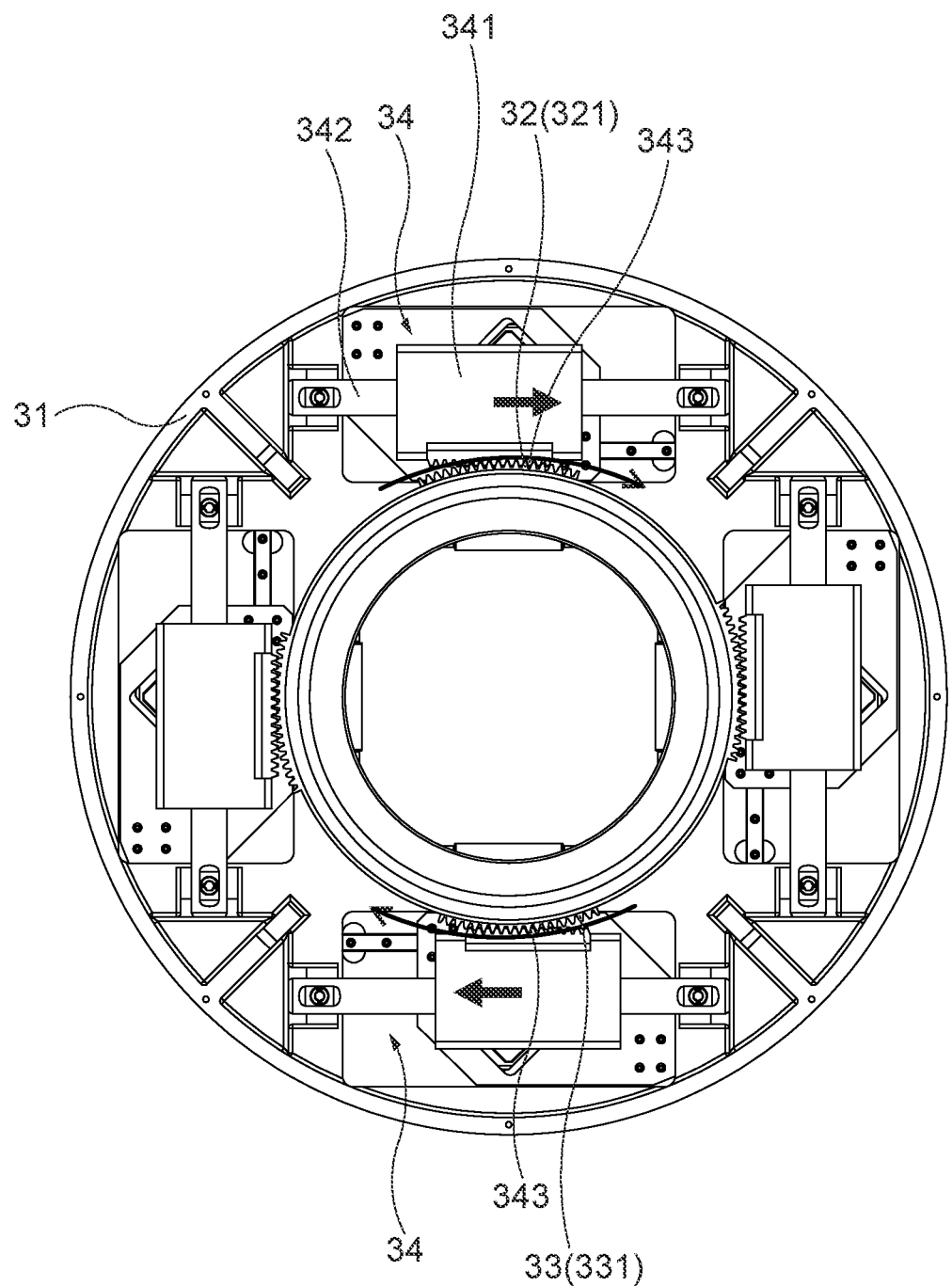
FIGS. 7-10 are schematic views showing the clamping of a pipe in accordance with the present invention pipe.
Figure 8:
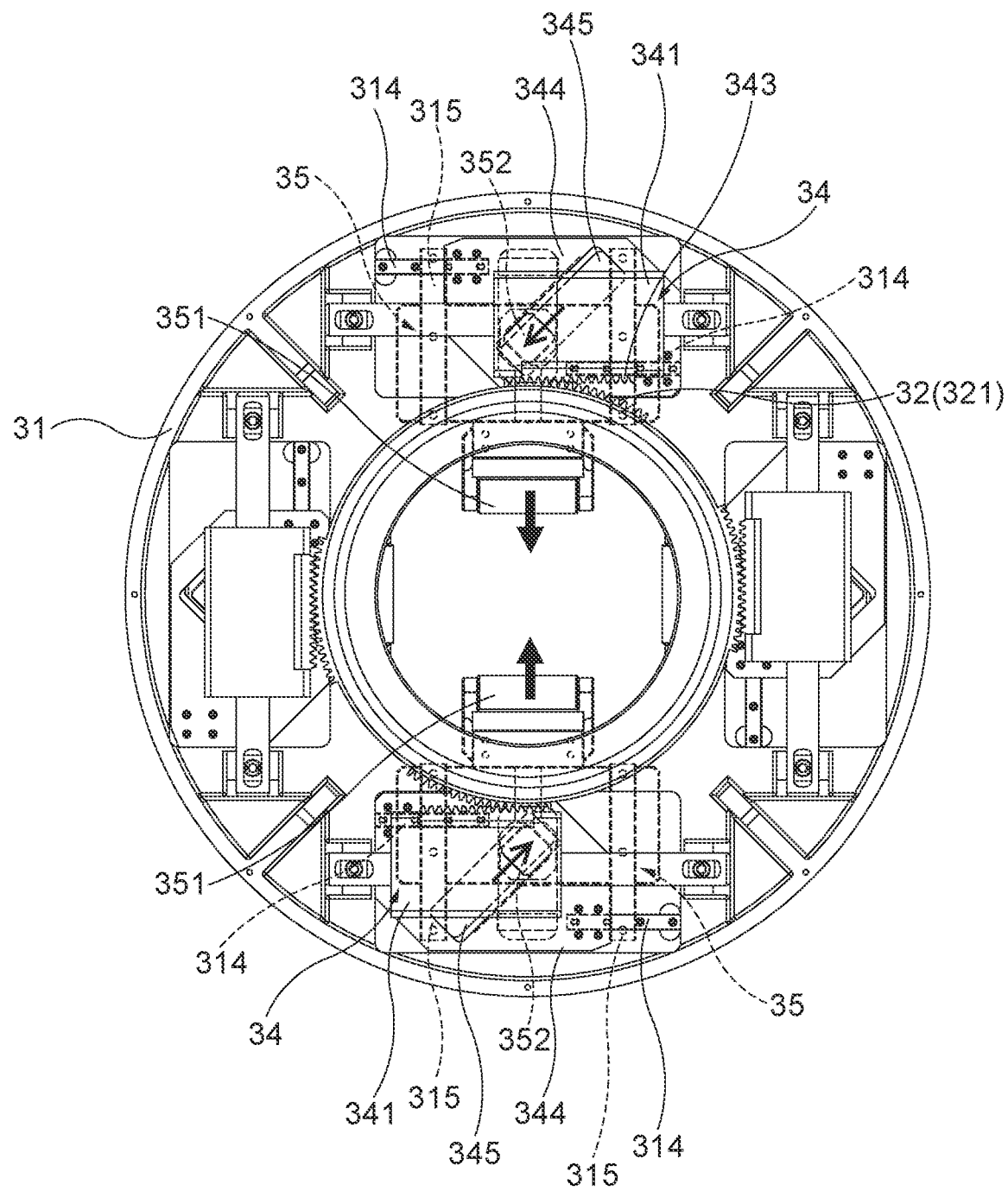

With reference to FIG. 7 for the operation of driving the clamping component 35 vertically to clamp a pipe in accordance with an embodiment of the present invention, when compressed air enters into the pneumatic cylinder 341 of the linkage module 34, the rod 342 is situated at a fixed state, so that the air will drive the rod 342 to be displaced on the pneumatic cylinder 341, and the gear rack 321 engaged with the rack 343 will drive the first rotating ring 32 to rotate clockwise while the pneumatic cylinder 341 is being displaced, and the opposite pneumatic cylinder 341 of the other linkage module 34 will be displaced in an opposite direction synchronously (refer to FIG. 8). When the pneumatic cylinder 341 is moving, the block 344 fixed onto the pneumatic cylinder 341 is displaced along the first slide rail 314 to change the position of the oblique slot 345, so that the slider 352 of the clamping component 35 slides along the second slide rail 315 and from an end of the oblique slot 345 of the block 344 to the other end approaching the axis of the turntable 31. While the slider 352 of the clamping component 35 is moving, the claw 351 moves towards the axis of the turntable 31 to achieve the effect of clamping the pipe.

Figure 9:
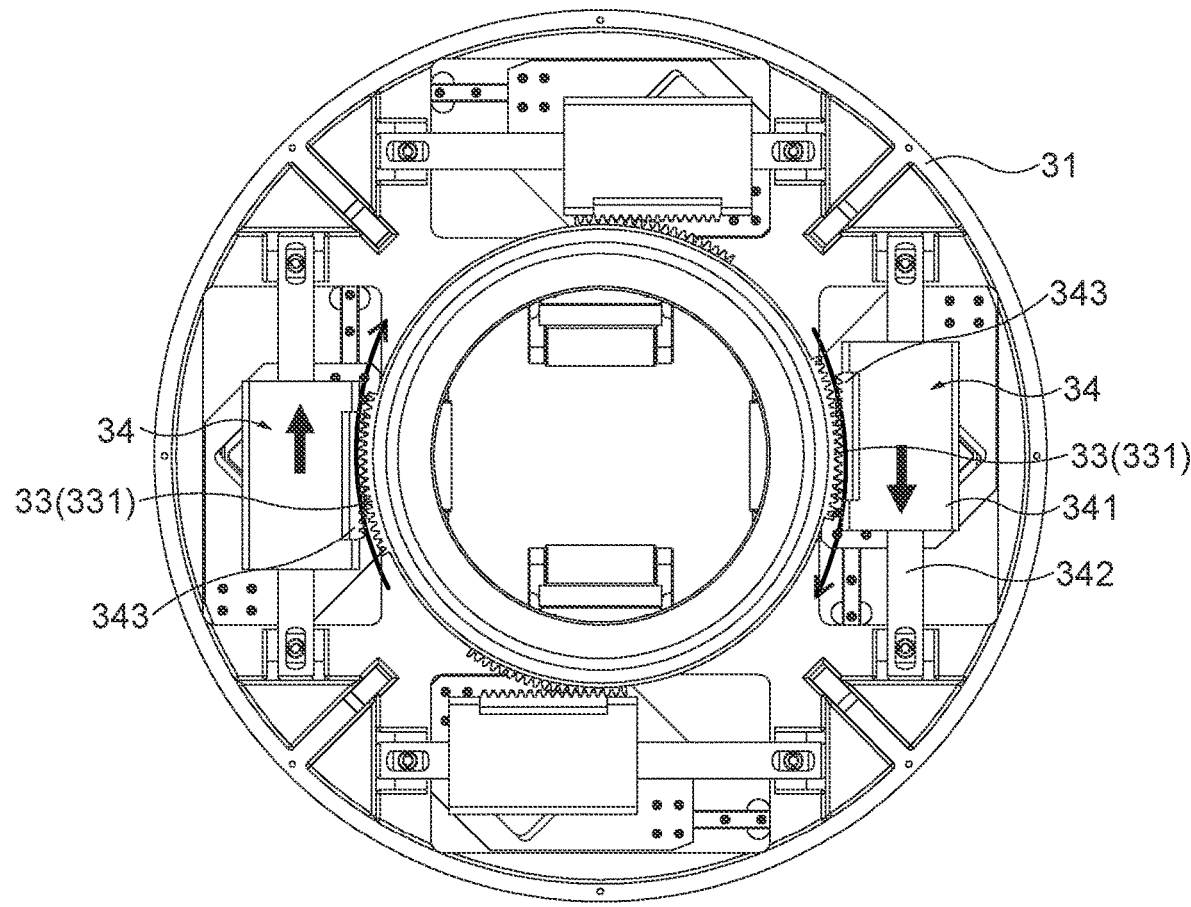
Figure 10:
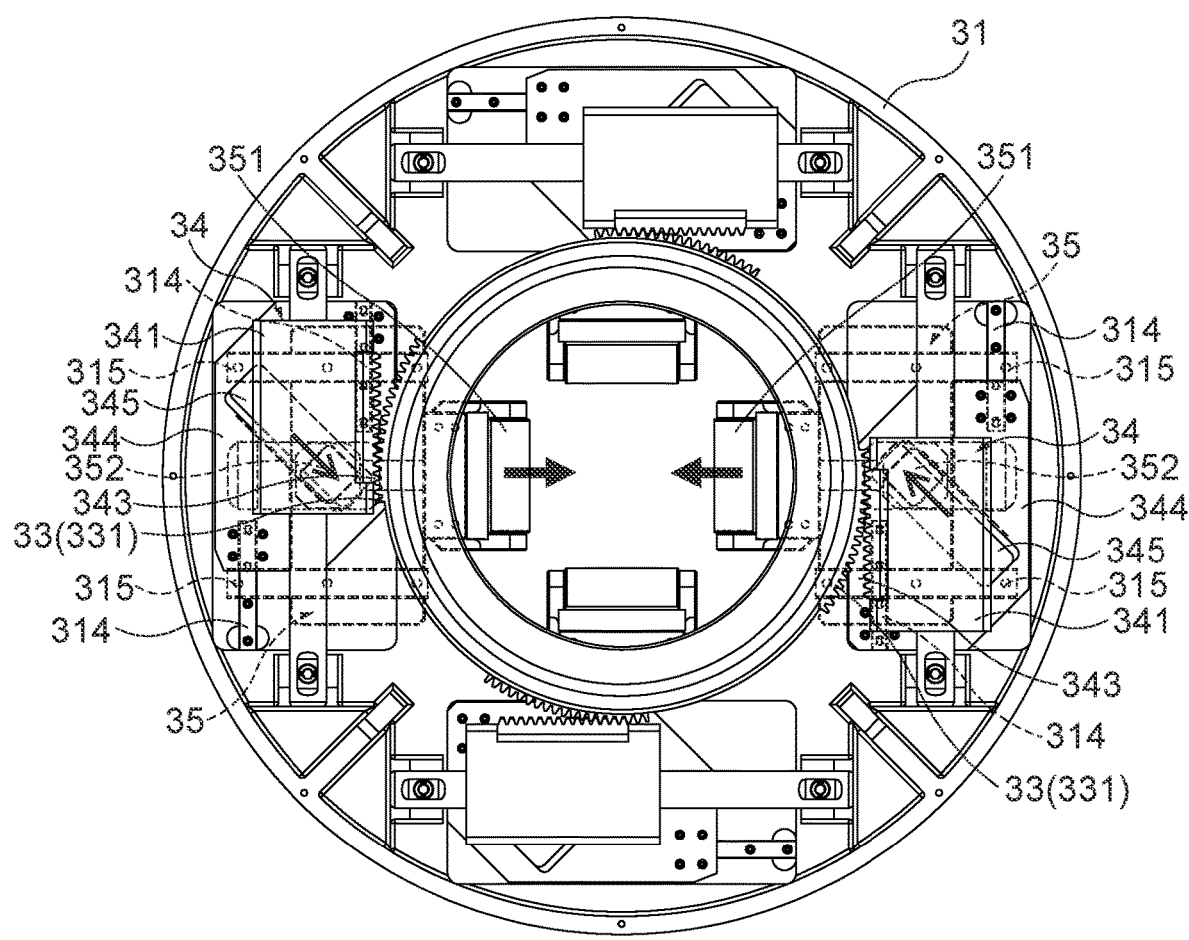

With reference to FIG. 9 for the operation of driving the clamping component 35 driven horizontally to clamp a pipe in accordance with an embodiment of the present invention, when compressed air enters into the pneumatic cylinder 341 of the linkage module 34, the rod 342 is situated at a fixed state, so that the air will drive the pneumatic cylinder 341 to be displaced on the rod 342, and the gear rack 331 engaged with the rack 343 will drive the second rotating ring 33 to rotate clockwise while the pneumatic cylinder 341 is being displaced, and the opposite pneumatic cylinder 341 of the other linkage module 34 will be displaced towards the opposite direction synchronously (Refer to FIG. 10 as well). While the pneumatic cylinder 341 is moving, the block 344 fixed to the pneumatic cylinder 341 is displaced along the first slide rail 314 to change the position of the oblique slot 345, so that the slider 352 of the clamping component 35 slides along the second slide rail 315 and from an end of the oblique slot 345 of the block 344 to the other end approaching the axis of the turntable 31. While the slider 352 of the clamping component 35 is moving, the claw 351 moves towards the axis of the turntable 31 to achieve the effect of clamping the pipe.

The displacement of the stroke of the four linkage modules 34 and the clamping components 35 is adjusted according to the shape or diameter of the pipe. After the pipe is clamped, the power source 41 of the power mechanism 4 drives the linkage gear set 42 to rotate (See FIG. 3 again), so as to drive the turntable 31 to rotate synchronously and carry out the pipe processing operation by a pipe processing machine such as a laser processing machine.

Figure 11:
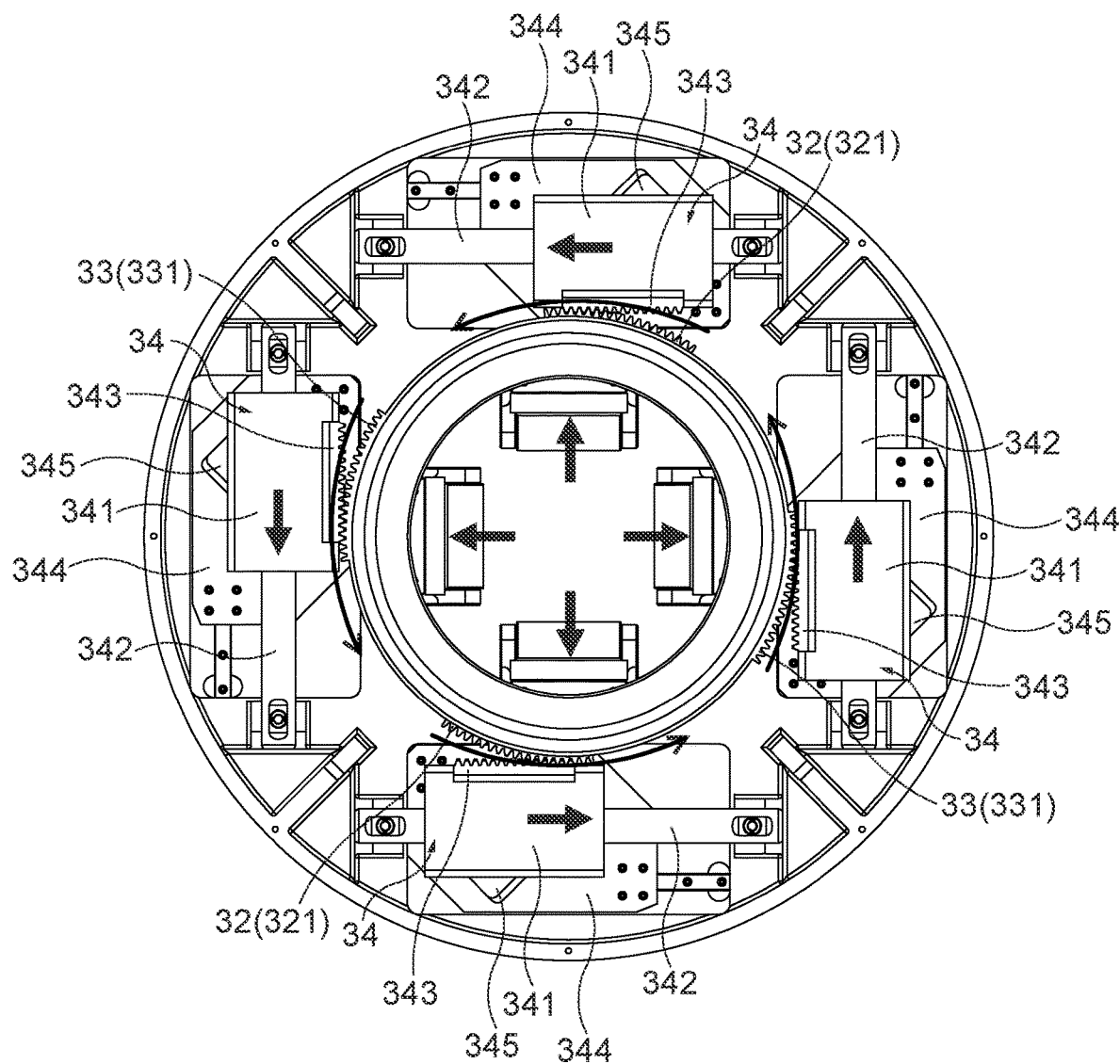
FIG. 11 is a schematic view showing the release from the clamping of a pipe in accordance with the present invention.

In FIG. 11, when it is necessary to release the clamping of the pipe, compressed air is provided to drive the pneumatic cylinder 341 of the linkage module 34 to move on the rod 342, and the rack 343 of the pneumatic cylinder 341 drives the first rotating ring 32 and the second rotating ring 33 to rotate counterclockwise, so that the opposite pneumatic cylinder 341 will be displaced in an opposite direction synchronously. In the meantime, the displacement of the block 344 of the pneumatic cylinder 341 slides the slider 352 of the clamping component 35 (not shown in the figure) from the oblique slot 345 of the block 344, so to achieve the effect of releasing the clamping of the pipe.

In summation, the pipe clamping apparatus of the present invention has the following effects:

In the pipe clamping apparatus of the present invention, the linkage module and the clamping component are disposed on the inner end surface and the outer end surface of the turntable respectively, so that the weight of the linkage module and the weight of the clamping component can be distributed uniformly at both ends of the turntable to avoid the turntable from being tilted due to the shifted center of gravity or skewing the pipe to affect the pipe processing precision.

In the pipe clamping apparatus of the present invention, the linkage module and the clamping component are staggered and disposed on the turntable, so that the four linkage modules and the clamping components are configured and grouped two by two to achieve the effect of reducing the total volume of components, the occupied space, and the cost of the pipe clamping apparatus.

In the pipe clamping apparatus of the present invention, the rod of the pneumatic cylinder is fixed, so that when the compressed air is driving the pneumatic cylinder to move, the clamping component will be displaced synchronously. Compared with the conventional clamping apparatus whose pneumatic cylinder drives the output shaft to operate and links the claw by the displacement of the output shaft, the present invention provides a simpler structure to improve the operational efficiency.

What is claimed is:

1. A pipe clamping apparatus of a pipe processing machine, driven to rotate by a power mechanism, and comprising:
   a turntable, having a rotating shaft linked to the power mechanism, an inner end surface and an outer end surface, plural sets of first slide rails and second slide rails disposed on the inner end surface and the outer end surface respectively, and a plurality of slot openings formed on the turntable;
   a first rotating ring, sheathed on the rotating shaft, and having a gear rack formed on two opposite ring surfaces of the first rotating ring separately;
   a second rotating ring, having a gear rack formed on two opposite ring surfaces of the second rotating ring and staggered with the gear rack of the first rotating ring separately;
   a plurality of linkage modules, for locking a rod of a pneumatic cylinder to the inner end surface securely, and having a rack disposed on the pneumatic cylinder and facing an end surface of the first or second rotating ring and engaged with one of the gear racks of the rotating ring,
   a block fixed to the pneumatic cylinder, and the block having an oblique slot and a rail slot embedded into the first slide rail; and
   a plurality of clamping components, having a claw formed thereon, and a slider passing through the slot opening and the oblique slot, and the clamping component having a rail slot formed thereon and embedded into the second slide rail.

2. The pipe clamping apparatus of a pipe processing machine according to claim 1, wherein the power mechanism axially couples a driving shaft of a power source to a linkage gear set, and sheathes the linkage gear set on the rotating shaft, so that the power source drives the linkage gear set to rotate and drive the turntable to rotate simultaneously.

3. The pipe clamping apparatus of a pipe processing machine according to claim 1, wherein the pipe processing machine is a laser processing machine.

* * * * *